(12) United States Patent
Patil et al.

(10) Patent No.: US 9,667,765 B2
(45) Date of Patent: May 30, 2017

(54) METHOD AND APPARATUS FOR RELAYING DATA COMMUNICATIONS IN A BLUETOOTH NETWORK

(75) Inventors: Naganagouda B. Patil, Ashland, IN (US); Steven H. Isabelle, Newton, MA (US)

(73) Assignee: Bose Corporation, Framingham, MA (US)

( * ) Notice: Subject to any disclaimer, the term of this patent is extended or adjusted under 35 U.S.C. 154(b) by 283 days.

(21) Appl. No.: 13/435,840

(22) Filed: Mar. 30, 2012

(65) Prior Publication Data

US 2013/0260672 A1    Oct. 3, 2013

(51) Int. Cl.
- *H04M 1/72* (2006.01)
- *H04M 1/725* (2006.01)
- *H04M 1/60* (2006.01)
- *H04W 88/04* (2009.01)

(52) U.S. Cl.
CPC ........ *H04M 1/7253* (2013.01); *H04M 1/6066* (2013.01); *H04M 2250/02* (2013.01); *H04W 88/04* (2013.01)

(58) Field of Classification Search
CPC ......... H04L 12/28; H04L 12/56; H04L 29/06; H04L 29/08; H04W 52/00; H04B 7/17; H04B 7/00; H04B 7/15; H04R 5/02; G06F 17/00; H04Q 7/00
USPC ................................................ 455/11.1, 41.2
See application file for complete search history.

(56) References Cited

U.S. PATENT DOCUMENTS

| | | | |
|---|---|---|---|
| 2008/0298613 A1* | 12/2008 | Slamka et al. | 381/311 |
| 2009/0305632 A1* | 12/2009 | Sarkissian et al. | 455/41.2 |
| 2011/0207447 A1* | 8/2011 | Bhow | H04M 1/2535 455/417 |

(Continued)

FOREIGN PATENT DOCUMENTS

| | | |
|---|---|---|
| JP | 2004348377 A | 12/2004 |
| JP | 200531815 A | 11/2005 |

(Continued)

OTHER PUBLICATIONS

The International Search Report and the Written Opinion of the International Searching Authority mailed May 28, 2013 in corresponding application PCT/US2013/030509.

(Continued)

*Primary Examiner* — Wesley Kim
*Assistant Examiner* — Dong-Chang Shiue
(74) *Attorney, Agent, or Firm* — Brian M. Dingman; Dingman IP Law, PC

(57) ABSTRACT

A communication destination device includes a transceiver configured to exchange communication with a first endpoint device via a first wireless communication channel and configured to exchange communication with a second endpoint device via a second wireless communication channel, the second wireless communication channel being distinct from the first wireless communication channel. The communication destination device includes a translator element configured to receive a message from one of the first endpoint device and the second endpoint device and to translate the message from a first message format into a second message format, the second message format being distinct from the first message format.

25 Claims, 3 Drawing Sheets

(56) References Cited

U.S. PATENT DOCUMENTS

2011/0255454 A1* 10/2011 Hauser et al. ............... 370/311
2012/0009906 A1* 1/2012 Patterson et al. .......... 455/414.1
2012/0231769 A1* 9/2012 Sakissian et al. ......... 455/414.1

FOREIGN PATENT DOCUMENTS

| JP | 200960163 A | 3/2009 |
| JP | 2009509400 A | 3/2009 |
| JP | 2009302681 A | 12/2009 |
| JP | 2010-136076 A | 6/2010 |

OTHER PUBLICATIONS

Office Action issued on Oct. 27, 2015 in corresponding Japanese Patent Application 2015-503256.
English translation of Office Action issued on Oct. 27, 2015 in corresponding Japanese Patent Application 2015-503256.
Office Action issued on Jun. 9, 2016 in corresponding Japanese Patent Application 2015-503256.
English translation of Office Action issued on Jun. 9, 2016 in corresponding Japanese Patent Application 2015-503256.

* cited by examiner

METHOD AND APPARATUS FOR RELAYING DATA COMMUNICATIONS IN A BLUETOOTH NETWORK

BACKGROUND

Wireless communication is utilized in wide ranging applications, such as cellular phone communication and data signal exchange between two or more devices. Certain wireless communication protocols, such as the Bluetooth communication protocol, allow bidirectional communication between a communication destination device, such as a Bluetooth-enabled headset, and a variety of Bluetooth-enabled, computerized endpoint devices, such as cellular phones having Internet capability and additional functionality (e.g., smart phones), laptop computers, and computerized devices configured as panels (e.g., tablet devices).

SUMMARY

As indicated above, conventional Bluetooth destination devices, such as Bluetooth enabled headsets, allow bidirectional communication with a number of Bluetooth-enabled endpoint devices. However, as users utilize more than one electronic device at a time, the users are required to physically, and separately, access the devices.

For example, consider the situation where a user utilizes a Bluetooth-enabled headset to simultaneously access a Bluetooth-enabled tablet device and a Bluetooth-enabled smart phone. When using the tablet device, the user may be interested in accessing certain aspects of the smart phone, such as text message notification, caller identification information notification, or the ability to call another person, for example. However, while the tablet device and the smart phone are connected to the common headset accessory via Bluetooth, the Bluetooth protocols may not allow the tablet and smart phone to directly communicate with each other. Accordingly, in order to access the functionality of the smart phone, the user must physically obtain the smart phone, such as by retrieving the smart phone from a storage location, and redirect his focus from the tablet device to the smart phone. Such switching between devices can be inconvenient to the user. Furthermore, in the case where the user is not in direct physical possession of one of the devices, such as the smart phone, the user can miss notifications, such as reminders or incoming text messages, on that device because his focus is on another device, such as the tablet device.

By contrast to conventional devices, embodiments of the present innovation relate to a method and apparatus for relaying data communications in a network, such as a Bluetooth network. In one arrangement, a Bluetooth-enabled communication destination device is configured as a relay point to exchange communications among other Bluetooth-enabled endpoint devices in a Bluetooth network. For example, the Bluetooth-enabled communication destination device, such as a headset, is configured to translate Bluetooth communication received from a first Bluetooth endpoint device, such as a smart phone, into a form suitable for a second Bluetooth endpoint device, such as a tablet device, and provide the translated communication messages to the target endpoint device.

Furthermore, the Bluetooth-enabled communication destination device provides a user with the ability to access and control the functionality of the second endpoint device from the first endpoint device. For example, based upon the communication messages, a user of the tablet device can access certain functionality of the smart phone, such as text messages or caller identification information, directly from the tablet device using the Bluetooth-enabled headset as the relay point. Furthermore, with the Bluetooth-enabled headset configured as a relay, the tablet device can control certain functionalities of the smart phone, such as the initiation of a call or the activation of a camera or microphone of the smart phone from the tablet via commands set over a standard Bluetooth communication profile.

In general, one aspect of the disclosure features a communication destination device. The communication destination device includes a transceiver configured to exchange communication with a first endpoint device via a first wireless communication channel and configured to exchange communication with a second endpoint device via a second wireless communication channel, the second wireless communication channel being distinct from the first wireless communication channel. The communication destination device includes a translator element configured to receive a message from one of the first endpoint device and the second endpoint device and to translate the message from a first message format into a second message format, the second message format being distinct from the first message format.

In general, one aspect of the disclosure features, in a communication destination device, a method for relaying communication between a first endpoint device and a second endpoint device. The method includes establishing, by the communication destination device, a first wireless communication channel with the first endpoint device and a second wireless communication channel with the second endpoint device, the first wireless communication channel being distinct from the second wireless communication channel. The method includes receiving, by the communication destination device, a communication message from the first endpoint device via the first wireless communication channel, the communication message having a first message format. The method includes translating, by the communication destination device, the communication message having the first message format into a notification message having a second message format, the second message format being distinct from the first message format. The method includes transmitting, by the communication destination device, the notification message to the second endpoint device via the second wireless communication channel.

Various additional implementations may include one or more of the following features. The method can include receiving, by the communication destination device, an instruction message from the second endpoint device via the second wireless communication channel, the instruction message having the second message format, translating, by the communication destination device, the instruction message having the second message format into a response message having the first message format, and transmitting, by the communication destination device, the response message to the first endpoint device via the first wireless communication channel. The method can include, when receiving the instruction message from the second endpoint device, receiving, by the communication destination device, the instruction message from the second endpoint device via the second wireless communication channel, the instruction message directing an operation characteristic of the first endpoint device in response to the notification message. The method can include, when transmitting the notification message to the second endpoint device via the second wireless communication channel, transmitting, by the communication destination device, the notification message to the second endpoint device via the second wireless communication channel, the notification message directing an operation characteristic of the second endpoint device in response to the communication message. The method can include the notification message being configured to pause at least a portion of an operation of the second endpoint device.

The method can include when establishing the first wireless communication channel with the first endpoint device and the second wireless communication channel with the second endpoint device establishing, by the communication destination device, a first Bluetooth channel with the first. At least one of the first endpoint device and the second endpoint devices can be configured as an audio source. The communication destination device can configured as an audio sink, such as a hands free device. The communication destination device can be configured as a Bluetooth headset device.

The method can include, when translating the communication message having the first message format into a notification message having a second message format translating, by the communication destination device, the communication message having a first Bluetooth protocol format into a notification message having a second Bluetooth protocol format, the first Bluetooth protocol format being distinct from the second Bluetooth protocol format. The method can include when translating the instruction message having the second message format into a response message having the first message format, translating, by the communication destination device, the instruction message having a first Bluetooth protocol format into a response message having a second Bluetooth protocol format, the first Bluetooth protocol format being distinct from the second Bluetooth protocol format.

The method can include in response to establishing the second wireless communication channel with the second endpoint device, forwarding a protocol response application to the second endpoint device to configure the second endpoint device to respond to the notification message.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

Figure 1:
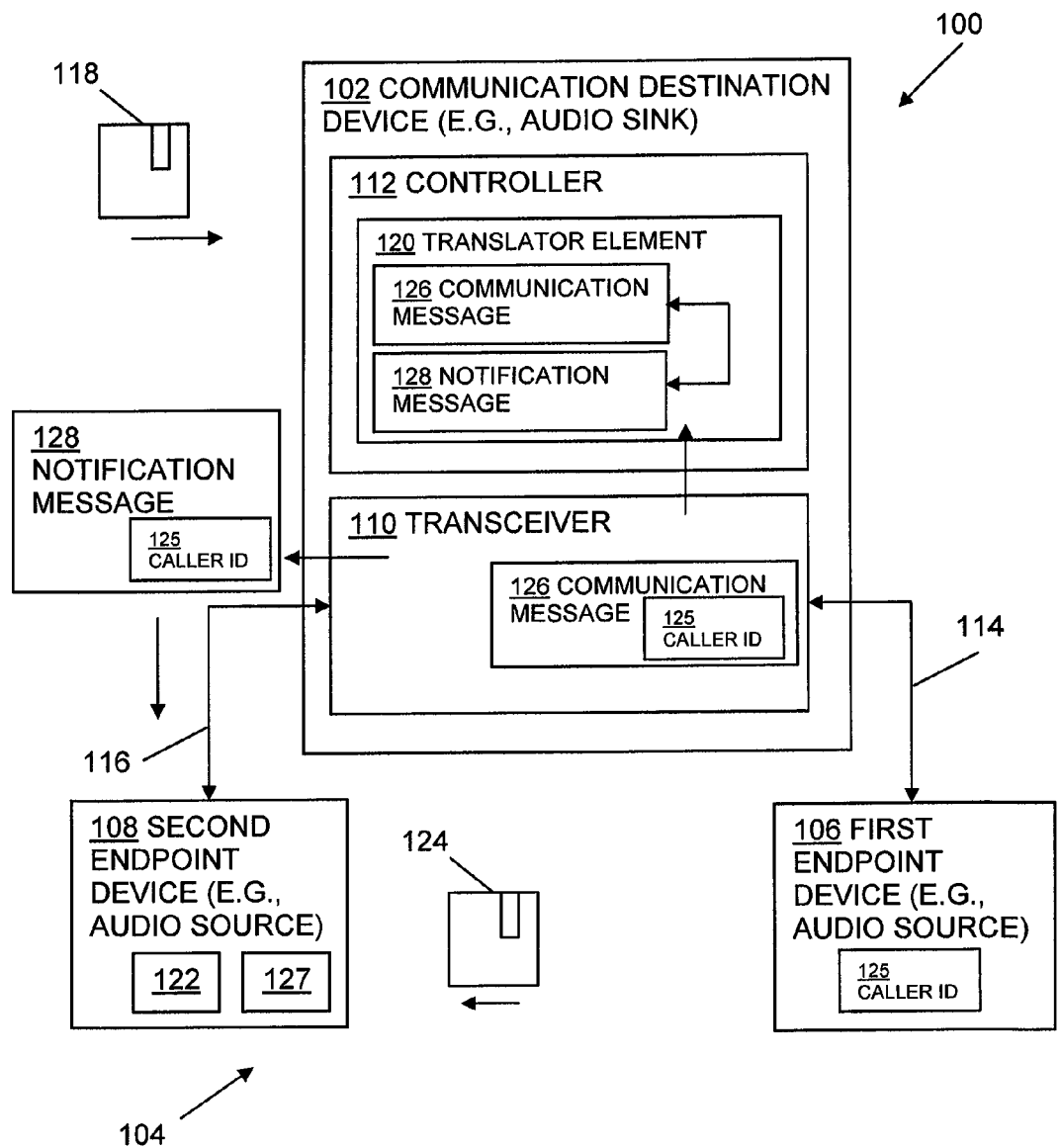
FIG. 1 illustrates a schematic representation of a wireless communication network, according to one arrangement.

FIG. 1 illustrates a wireless communication network 100, according to one arrangement. The wireless communication network 100 includes a communication destination device 102 and a set of endpoint devices 104, such as a first endpoint device 106 and a second endpoint device 108, each disposed in wireless communication with the communication destination device 102. While the wireless communication network 100 can be configured in a variety of ways, in one arrangement the wireless communication network 100 is configured as a set of point-to-point links using the Bluetooth wireless communication technology. In this arrangement, each of the communication destination device 102 and endpoint devices 106, 108 are configured as Bluetooth-enabled devices and are operable to communicate using a set of Bluetooth protocols.

In one arrangement, the communication destination device 102 is configured as a multipoint device, such as an audio sink device or a hands free (i.e., wireless) Bluetooth headset device. The communication destination device 102 can include a transceiver 110 configured to establish multiple wireless communication channels with the endpoint devices of the set of endpoint devices 104. In the arrangement illustrated, the transceiver 110 is configured to establish a first wireless communication channel 114 with the first endpoint device 106 and a second wireless communication channel 116 with the second endpoint device 108, where the first wireless communication channel 114 is distinct from the second wireless communication channel 116.

Each of the first and second wireless communication channels 114, 116 are bidirectional per endpoint device 106, 108 in that the communication destination device 102 is configured to exchange communication along the channels 114, 116 with the endpoint devices. For example, the communication destination device 102 can exchange communication with the first endpoint device 106 along the first channel 114 and can exchange communication with the second endpoint device 108 along the second channel 116. Additionally, as will be described in detail below, the communication destination device 102 is also configured to relay communication between the endpoint devices 106, 108 using the respective communication channels 114, 116.

While the communication channels 114, 116 can be configured to exchange information or communication between the communication destination device 102 and the endpoint devices 106, 108 using a variety of protocols, in one arrangement the first and second communication channels 114, 116 are configured as Bluetooth channels that exchange messages based upon particular Bluetooth-based wireless communication protocols. While a number of Bluetooth profiles are available, in order to communicate on a Bluetooth channel 114, 116, each of the communication destination device 102 and the respective endpoint devices 106, 108 are configured with a particular subset of Bluetooth profiles. For example, in the case where the communication destination device 102 is configured as a wireless Bluetooth headset device and the first endpoint device 106 is configured as a Bluetooth-enabled smart phone, the devices 102, 106 are configured to communicate over the first Bluetooth channel 114 using the Bluetooth Hands-Free Profile (HFP) and the Headset Profile. Additionally, in the case where the communication destination device 102 is configured as a wireless Bluetooth headset device and the second endpoint device 108 is configured as a Bluetooth-enabled tablet device 108, the devices 102, 108 are configured to communicate over the second Bluetooth channel 116 using the Advanced Audio Distribution Profile (A2DP) and the Serial Port Profile (SPP).

The communication destination device 102 also includes a controller 112, such as a memory and a processor. The controller 112 is configured to relay communication between the first endpoint device 106 and the second endpoint device 108. For example, the controller 112 is configured with a translator element 120 that receives messages from one endpoint device in one profile or format and converts or translates the message into another profile or format that is compatible with one or more other endpoint devices in the wireless network 100. Accordingly, the translator element 120 allows the communication destination device 102 to pass messages configured in otherwise incompatible message formats among the endpoint devices 104 in the wireless communication network 100.

In one arrangement, the controller 112 stores a communication relay application that, when executed by the controller 122, causes the controller to perform the operation of translating and relaying communication between two endpoint devices in the network 100. The communication relay application installs on the communication destination device 102 from a computer program product 118. In certain arrangements, the computer program product 118 is available in a standard off-the-shelf form such as a shrink wrap package (e.g., CD-ROMs, diskettes, tapes, or flash drives). In other arrangements, the computer program product 118 is available in a different form (e.g., propagated signals, a network installation, or downloadable online media). In still other arrangements, the computer program product 118 is part of a storage medium contained within the communication destination device 102 as part of a memory from which such software may be loaded.

Each of the first and second endpoint devices 106, 108 are configured as a computerized device that can exchange wireless communications with the communication destination device 102 via first and second communication channels 114, 116, respectively. For example, each of the first and second endpoint devices 106, 108 can be configured as an audio source device, such as a Bluetooth-enabled smart phone, tablet device, or other computerized device. Additionally, each of the first and second endpoint devices can include a transceiver (not shown) configured to establish respective wireless communication channels 114, 116 with the communication destination device 102.

In one arrangement, at least one of the endpoint devices 106, 108 is configured to recognize and respond to incoming, protocol-translated communication received from the communication destination device 102 and associated with the other endpoint device. For example, the second endpoint device 108 can include a controller 122 operable to recognize messages or communication received from the communication destination device 102 configured in a protocol-translated communication format.

In one arrangement, the controller 122 stores a response application that, when executed by the controller 122, causes the controller to perform the operation of recognizing and responding to incoming, protocol-translated communication, such as received from the communication destination device 102. The protocol response application installs on the second endpoint device 108 from a computer program product 124. In certain arrangements, the computer program product 124 is available in a standard off-the-shelf form such as a shrink wrap package (e.g., CD-ROMs, diskettes, tapes, etc.). In other arrangements, the computer program product 124 is available in a different form (e.g., propagated signals, a network installation, purchasable and downloadable online media, etc.). In still other arrangements, the computer program product 124 is part of a storage medium contained within the communication destination device 102, from which it is made available to the second endpoint device 108 over the communication channel 116 or some other communication channel. For example, as a result of establishing the communication channel 116 with the second endpoint device 108, the communication destination device 102 forwards the protocol response application as part of the computer program product 124 to the second endpoint device 108. This allows the computer program product 124 to be distributed by the communication destination device 102 for use with separately-acquired compatible endpoint devices. In another arrangement, a memory in the communication destination device 102 includes an identifier or address, in the form of a URL or the like, which when provided to the second endpoint device 108 allows the second end point device 108 to acquire the protocol response application from an on-line repository of applications compatible with the second endpoint device 108.

As indicated above, the communication destination device 102 is configured to relay communication between a first endpoint device 106 and a second endpoint device 108 in the wireless communication network 100. For the following description of the operation of the communication destination device 102, and by way of example only, assume the communication destination device 102 is configured as a hands free Bluetooth-enabled headset, the first endpoint device 106 is configured as a Bluetooth-enabled smart phone, the second endpoint device 108 is configured as a Bluetooth-enabled tablet device, and each of the end point devices 106, 108 is separately in communication with the communication destination device 102 using appropriate Bluetooth profiles.

In use, and with continued reference to FIG. 1, the communication destination device 102 first establishes wireless communication channels 114, 116 with the endpoint devices 106, 108 in the wireless network 100. For example, the Bluetooth-enabled headset 102 establishes a Bluetooth channel 114 with the Bluetooth-enabled smart phone 106 via a conventional Bluetooth pairing mechanism. As a result of the pairing, the headset 102 and smart phone 106 are configured to communicate with each other using the Bluetooth Hands-Free Profile and the Headset Profile, among others. Additionally, the Bluetooth-enabled headset 102 establishes a Bluetooth channel 116 with the Bluetooth-enabled tablet device 108 via the conventional Bluetooth pairing mechanism. As a result of the pairing, the headset 102 and tablet device 108 are configured to communicate with each other using the Advanced Audio Distribution Profile and the Serial Port Profile, among others. Additionally, during the pairing of the headset 102 and tablet device 108, the tablet device 108 can provide instructions to the headset 102 indicating that the tablet device 108 be notified regarding operation of, and allowed remote access to, other particular endpoint devices on the wireless network 100, such as the Bluetooth-enabled smart phone 106.

During operation, the communication destination device 102 can receive a communication message 126 from the first endpoint device 106 via the first wireless communication channel 114 where the communication message 126 is configured in a first message format. In one arrangement, the communication message 126 is configured to notify the communication destination device 102 regarding an operation state of the endpoint device 106 (e.g., notification regarding an incoming call, notification regarding an incoming text message, or notification of a caller's identity). For example, assume the case where the Bluetooth-enabled smart phone 106 receives a call from an external caller and that the call has associated caller identification information 125. In response, the smart phone 106 can utilize the Bluetooth Hands-Free Profile format to transmit the communication message 126 over the Bluetooth channel 114 to the headset 102 to notify the headset 102 as to the caller identification information 125 associated with the call.

Upon receiving the communication message 126, the communication destination device 102 translates the communication message 126 from the first message format into a notification message 128 having a second message format, the second message format being distinct from the first message format. For example, upon receiving the communication message 126, the Bluetooth-enabled headset 102 can compare the format of the message (i.e., the Bluetooth Hands-Free Profile format) with the formats utilized by the Bluetooth-enabled tablet device 108 (i.e., the Advanced Audio Distribution Profile and the Serial Port Profile formats). As a result of the comparison, the Bluetooth-enabled headset 102 detects the format of the communication message 126 as being incompatible with the messaging format utilized by the Bluetooth-enabled tablet device 108. The translator element 120, in turn, can convert the communication message 126 (i.e., the caller identification information 125) into a notification message 128 having a format that is recognizable by the Bluetooth-enabled tablet device 108 where the notification message 128 provides notification to the tablet device 108 regarding an operation state of smart phone 106. For example, the translator element 120 of the Bluetooth-enabled headset 102 can translate the communication message 126 from the standard Bluetooth Hands-Free Profile format, to another standard Bluetooth profile or to a nonstandard Bluetooth profile, such as APPLE Inc.'s wireless iPhone Access Protocol (iAP) communicated over the Serial Port Profile format. The communication destination device 102 then transmits the notification message 128 to the Bluetooth-enabled tablet device 108 via the second wireless communication channel 116 to notify the tablet device 108 as to the smart phone's reception of an incoming call and caller identification information 125 associated with the call.

In response to receiving the notification message 128 via communication channel 116, the controller 122 of the Bluetooth-enabled tablet device 108 can detect the notification message 128 as being a protocol-translated communication, such as based upon the Bluetooth profile format associated with the notification message 128. The controller 122, in turn, provides a notification to the user of the tablet device 108 regarding activation of the smart phone 106. For example, the controller 122 can format the notification message 128 and provide the corresponding caller identification information 125 to a display 127 associated with the tablet device 108.

Figure 2:
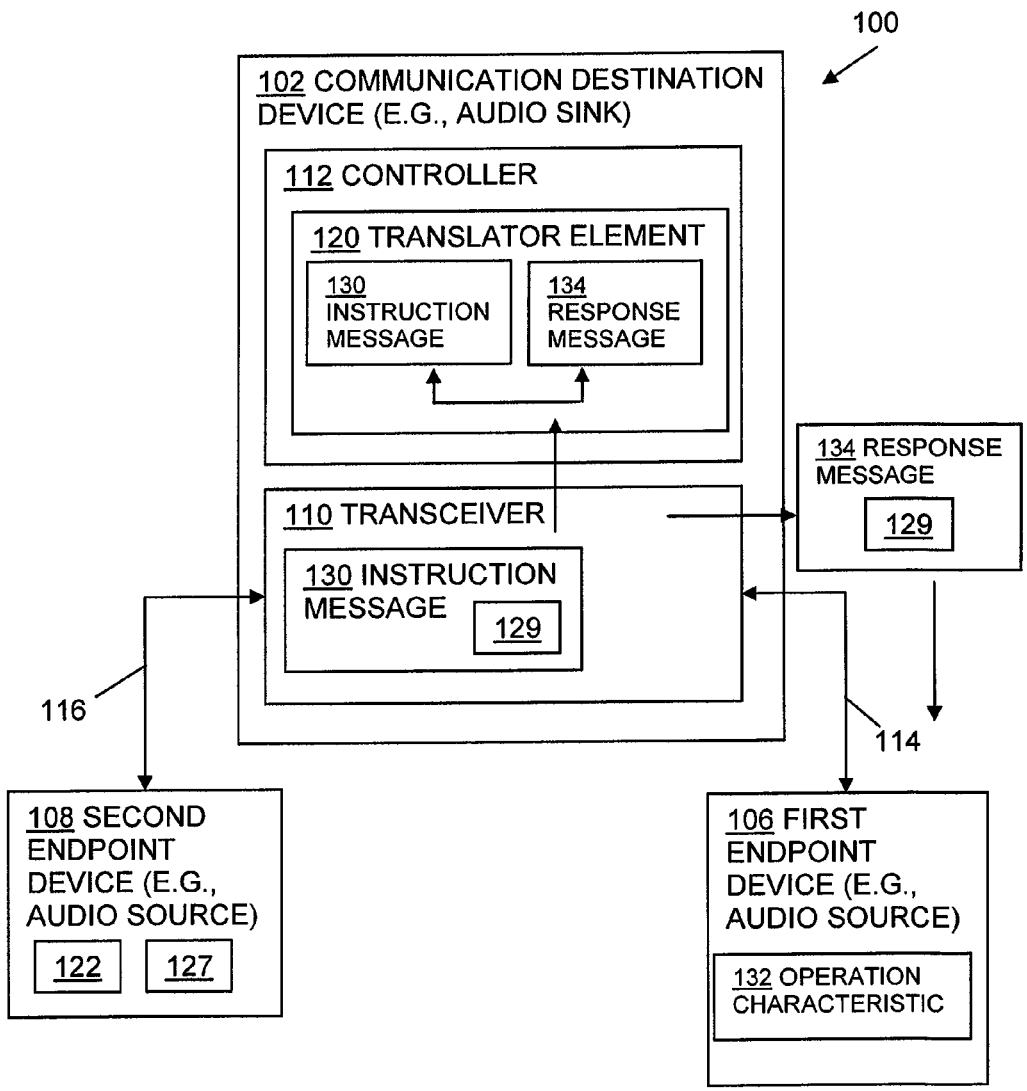
FIG. 2 illustrates the schematic representation of the wireless communication network of FIG. 1 showing operation of a communication destination device, according to one arrangement.

In one arrangement, in response to the display of the caller identification information 125, the tablet device user can provide the tablet device 108 with some instruction for addressing the operation state of the smart phone 106. For example, with reference to FIG. 2, the user of the tablet device 108 can instruct the tablet device 108 to direct the smart phone 106 to handle the call either by answering or ignoring the call. In response to the user's input, the tablet device 108 generates an instruction message 130 to direct an operation characteristic 132 of the first endpoint device 106. For example, assume the user instructs the tablet device to direct the smart phone 106 to answer the call. The tablet device 108 generates an answer message 129 as part of the instruction message 130. The tablet device then transmits the instruction message 130 over the Bluetooth channel 116 to the headset 102 such as via Serial Port Profile.

Upon receiving the instruction message 130, the Bluetooth-enabled headset 102 compares the format of the instruction message 130 (i.e., non-Bluetooth message format sent using the Serial Port Profile) with the formats utilized by the smart phone 106 (i.e., the Bluetooth Hands-Free Profile format). As a result of the comparison, the Bluetooth-enabled headset 102 detects the format of the instruction message 130 as being incompatible with the messaging format utilized by the Bluetooth-enabled smart phone 106. The translator element 120, in turn, converts the instruction message 130 (i.e., the answer message 129) into a response message 134 having a format, such as the Bluetooth Hands-Free Profile format, that is recognizable by the enabled smart phone 106. The communication destination device 102 forwards the response message to the smart phone via the Bluetooth communication channel 114. Upon reception, the smart phone 106 activates the operation characteristic 132 of the phone as directed in the response message 134 to answer the incoming call.

As indicated above, the communication destination device 102 operates as a relay point in a wireless network that allows a wireless endpoint device to access certain functionalities associated with other incompatible endpoint devices in the network 100. In a specific example, this communication destination device 102 allows a user to access functionality of a first endpoint device 106 from a second endpoint device 108 when both devices 106, 108 are connected to a common Bluetooth accessory, such as a Bluetooth-enabled headset. Furthermore, because communications are exchanged through the communication destination device 102, a lead or master endpoint device does not need to be aware of the other devices on the network 100.

As indicated above with reference to FIG. 1, the notification message 128 is configured to provide notification to an endpoint device regarding an operation state of another endpoint device in the network. For example, the notification message 128 causes the controller 122 of the tablet device 108 to display a notification regarding the operational state of the smart phone 106. In one arrangement, the notification message 128 is also configured to pause an operation of the second endpoint device 108. For example, in the case where the second endpoint device 108 is configured as a tablet device, the user of the tablet device 108 may use the device 108 to execute a variety of tasks, such as playing audio or video media. To minimize disruption to the user, prior to displaying a notification on the tablet display 127, the notification message 128 causes the tablet device 108 to pause operation of executing tasks, such as the playing of audio or video media. With such pausing, the user can attend to responding to the notification message 128 and resume execution of the paused tasks.

Figure 3:
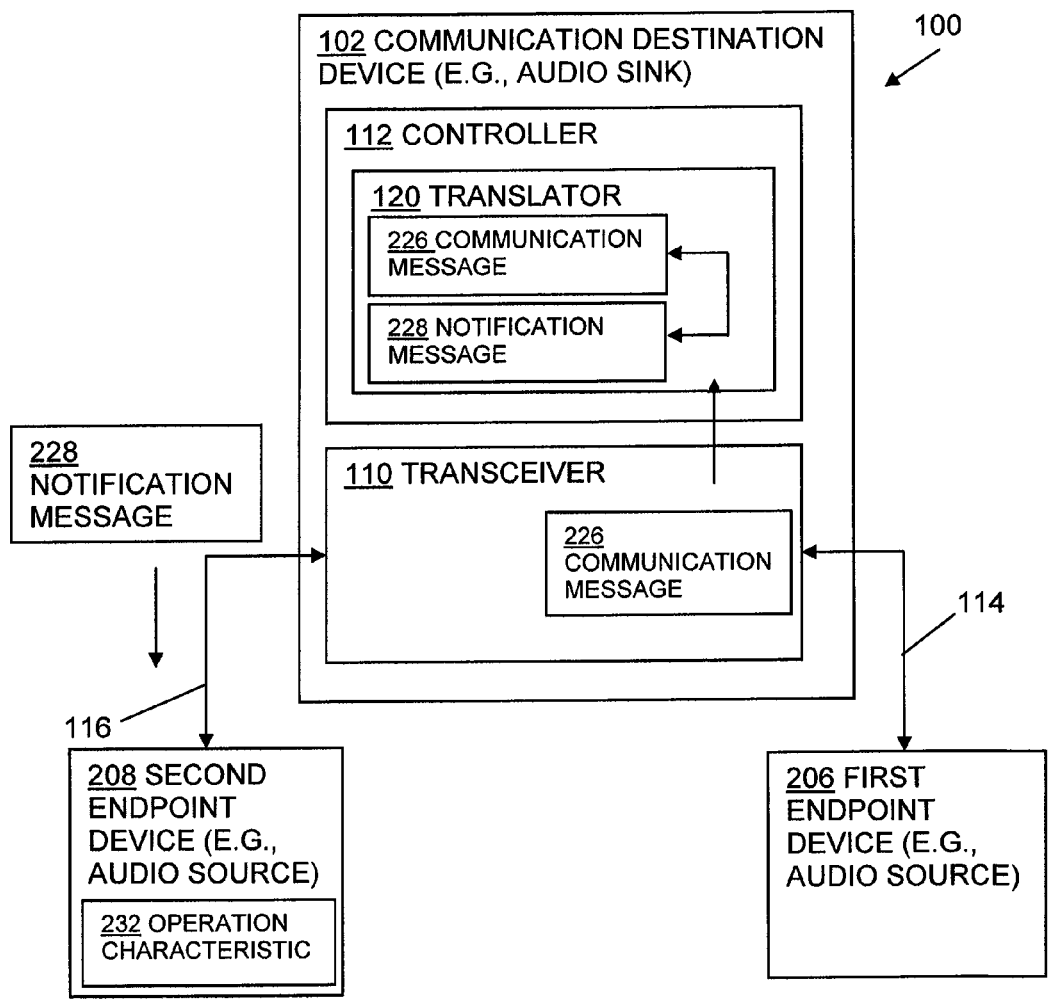
FIG. 3 illustrates the schematic representation of the wireless communication network of FIG. 1 showing operation of a communication destination device, according to one arrangement.

As described above, the communication message 126 is initiated by a first endpoint device 106 to notify the communication destination device 102 about an operation state of the endpoint device 106 (e.g., notification regarding an incoming call, notification regarding an incoming text message, or notification of a caller's identity). Such description is by way of example only. In one arrangement and with reference to FIG. 3, a communication message 226 initiated by a first endpoint device 206, such as a tablet device, is configured to direct or control an operation characteristic of another, second endpoint device 208, such as a smart phone, independent from the operational state of the second endpoint device 208.

For example, assume the first endpoint device 206 is configured as a Bluetooth-enabled tablet device and the second endpoint device 208 is configured as a Bluetooth enabled smart phone. In such a case, the first endpoint device 206 is aware of the presence of the second endpoint device 208 on the wireless network 100, such as by a notification received from the communication destination device 102. The first endpoint device 206 initiates transmission of a communication message 226 to the communication destination device 102 to control or direct an operation characteristic of the second endpoint device 208, such as to initiate a call from the first endpoint device 206, to activate a camera or microphone of the second endpoint device 208 from first endpoint device 206, or to display text messages stored by the second endpoint device 208 on the first endpoint device 206.

As provided above, the communication destination device 102 can receive the communication message 226, translates the message to a notification message 228 and forwards the notification message 228 to the second endpoint device 208. In response to the notification message 228, the second endpoint device 208 then operates in response to the commands provided by the communication message 228.

While various embodiments of the innovation have been particularly shown and described, it will be understood by those skilled in the art that various changes in form and details may be made therein without departing from the spirit and scope of the innovation as defined by the appended claims.

As indicated above, the transceiver 110 is configured to establish communication channels 114, 116 between the communication destination device 102 and a number of endpoint devices 106, 108. In one arrangement, the transceiver 110 is configured as a single, physical hardware device, such as a radio device, that establishes separate logical communication channels with each endpoint device 106, 108. Alternately, the transceiver 110 is configured as set of physically distinct devices where each device is configured to establish a wireless communication channel between the communication destination device 102 and each respective endpoint device 106, 108.

As indicated above, the first and second wireless communication channels 114, 116 are configured as Bluetooth wireless communication channels. Such indication is by way of example only. In one arrangement, the communication destination device 102 is configured as a common accessory that establishes individual wireless links or channels with the set of endpoint devices 104 which utilize a variety of communication protocols, including cases where each of the set of endpoint devices uses a different communication protocol than others of the set. In such an arrangement, the communication destination device 102 allows communication between the endpoint devices in cases where it is inconvenient or impossible to connect the two endpoint devices so that they can communicate directly.

As described above, FIG. 1 illustrates the set of endpoint devices 104 as including two endpoint devices 106, 108. Such illustration is by way of example only. It should be understood that the set of endpoint devices 104 can include greater than two endpoint devices and that the communication destination device 102 maintains communication channels, such as Bluetooth-enabled communication channels, with these additional endpoint devices.

What is claimed is:

1. In a Bluetooth-enabled headset, a method for relaying communication between a Bluetooth-enabled smart phone and a Bluetooth-enabled portable computing device, comprising:

establishing, by the headset, a first wireless communication channel between the headset and the smart phone and a second wireless communication channel between the headset and the portable computing device, the first wireless communication channel being distinct from the second wireless communication channel;

receiving, by the headset, a communication message from the smart phone via the first wireless communication channel, wherein the communication message is regarding an incoming telephone call that has not been answered by the smart phone, and has a first message format;

translating, by the headset, the communication message having the first message format into a notification message having a second message format, the second message format being distinct from the first message format;

transmitting, by the headset, the notification message to the portable computing device via the second wireless communication channel, where the notification message notifies the portable computing device as to the reception of an incoming telephone call that has not been answered by the smart phone;

receiving, by the headset, an instruction message from the portable computing device via the second wireless communication channel, the instruction message being responsive to a user, in response to the portable computing device receiving the notification message, providing the portable computing device with an instruction for the smart phone to answer or ignore the telephone call, the instruction message having the second message format;

translating, by the headset, the instruction message having the second message format into a response message having the first message format; and transmitting, by the headset, the response message to the smart phone via the first wireless communication channel, wherein the response message causes the smart phone to answer or ignore the telephone call.

2. The method of claim 1 wherein the portable computing device is playing audio or video media before it receives the notification message, and wherein the notification message causes the portable computing device to pause the audio or video media.

3. The method of claim 2 wherein the notification message is displayed on the portable computing device after the audio or video media is paused.

4. The method of claim 1, wherein the communication message is also a notification of the identity of the caller of the incoming telephone call, and the notification message further notifies the portable computing device as to caller identification information associated with the incoming telephone call.

5. In a Bluetooth-enabled audio sink, a method for relaying communication between a Bluetooth-enabled smart phone and a Bluetooth-enabled portable computing device, comprising:

establishing, by the audio sink, a first wireless communication channel between the audio sink and the smart phone and a second wireless communication channel between the audio sink and the portable computing device, the first wireless communication channel being distinct from the second wireless communication channel;

receiving, by the audio sink, a communication message from the smart phone via the first wireless communication channel, wherein the communication message is regarding an incoming telephone call that has not been answered by the smart phone, and has a first message format;

translating, by the audio sink, the communication message having the first message format into a notification message having a second message format, the second message format being distinct from the first message format;

transmitting, by the audio sink, the notification message to the portable computing device via the second wireless communication channel, where the notification message notifies the portable computing device as to the reception of an incoming telephone call that has not been answered by the smart phone;

receiving, by the audio sink, an instruction message from the portable computing device via the second wireless communication channel, the instruction message being responsive to a user, in response to the portable computing device receiving the notification message, providing the portable computing device with an instruction for the smart phone to answer or ignore the telephone call, the instruction message having the second message format;

translating, by the audio sink, the instruction message having the second message format into a response message having the first message format; and transmitting, by the audio sink, the response message to the smart phone via the first wireless communication channel, wherein the response message causes the smart phone to answer or ignore the telephone call.

6. The method of claim 5, wherein the notification message directs an operation characteristic of the portable computing device.

7. The method of claim 6, wherein the notification message is configured to pause at least a portion of an operation of the portable computing device.

8. The method of claim 5, wherein establishing the first wireless communication channel with the smart phone and the second wireless communication channel with the portable computing device comprises establishing, by the audio sink, a first Bluetooth channel with the smart phone and a second Bluetooth channel with the portable computing device.

9. The method of claim 8, wherein:
at least one of the smart phone and the portable computing devices is configured as an audio source.

10. The method of claim 9, wherein the audio sink is configured as a hands free device.

11. The method of claim 10, wherein the audio sink is configured as a Bluetooth headset device.

12. The method of claim 8, wherein the communication message has a first Bluetooth protocol format and the notification message has a second Bluetooth protocol format, the first Bluetooth protocol format being distinct from the second Bluetooth protocol format.

13. The method of claim 8, wherein the instruction message has a first Bluetooth protocol format and the response message has a second Bluetooth protocol format, the first Bluetooth protocol format being distinct from the second Bluetooth protocol format.

14. The method of claim 5, further comprising, in response to establishing the second wireless communication channel with the portable computing device, forwarding a protocol response application to the portable computing device to configure the portable computing device to respond to the notification message.

15. The method of claim 5, wherein the audio sink is configured as a hands free device.

16. The method of claim 15, wherein the audio sink is configured as a Bluetooth headset device.

17. The method of claim 5, wherein the portable computing device is a Bluetooth-enabled tablet device.

18. The method of claim 5, wherein the response message causes the smart phone to take an action relating to text messaging.

19. The method of claim 5 wherein the communication message is also a notification of the identity of the caller of the incoming telephone call, and the notification message further notifies the portable computing device as to caller identification information associated with the incoming telephone call.

20. A Bluetooth-enabled audio sink comprising:
a transceiver configured to establish a first wireless communication channel between the audio sink and a smart phone and a second wireless communication channel between the audio sink and a portable computing device, the first wireless communication channel being distinct from the second wireless communication channel;

a translator element configured to receive a communication message from the smart phone via the first wireless communication channel, wherein the communication message is regarding an incoming telephone call that has not been answered by the smart phone, and has a first message format;

wherein the translator element is configured to translate the communication message having the first message format into a notification message having a second message format, the second message format being distinct from the first message format;

wherein the transceiver is configured to transmit the notification message to the portable computing device via the second wireless communication channel, where the notification message notifies the portable computing device as to the reception of an incoming telephone call that has not been answered by the smart phone;

wherein the transceiver is configured to receive an instruction message from the portable computing device via the second wireless communication channel, the instruction message being responsive to a user, in response to the portable computing device receiving the notification message, providing the portable computing device with an instruction for the smart phone to answer or ignore the telephone call, the instruction message having the second message format;

wherein the translator element is configured to translate the instruction message having the second message format into a response message having the first message format; and wherein the transceiver is configured to transmit the response message to the smart phone via the first wireless communication channel, wherein the response message causes the smart phone to answer or ignore the telephone call.

21. The audio sink of claim 20 wherein the communication message is also a notification of the identity of the caller of the incoming telephone call, and the notification message further notifies the portable computing device as to caller identification information associated with the incoming telephone call.

22. A computer program product having a non-transitory computer-readable medium including computer program logic encoded thereon that, when performed on a controller in an audio sink, causes the audio sink to:
establish a first wireless communication channel between the audio sink and a smart phone and a second wireless communication channel between the audio sink and a portable computing device, the first wireless communication channel being distinct from the second wireless communication channel;

receive a communication message from the smart phone via the first wireless communication channel, wherein the communication message is regarding an incoming telephone call that has not been answered by the smart phone, and has a first message format;

translate the communication message having the first message format into a notification message having a second message format, the second message format being distinct from the first message format;

transmit the notification message to the portable computing device via the second wireless communication channel, where the notification message notifies the portable computing device as to the reception of an incoming telephone call that has not been answered by the smart phone;

receive an instruction message from the portable computing device via the second wireless communication channel, the instruction message being responsive to a user, in response to the portable computing device receiving the notification message, providing the portable computing device with an instruction for the smart phone to answer or ignore the telephone call, the instruction message having the second message format;

translate the instruction message having the second message format into a response message having the first message format; and transmit the response message to the smart phone via the first wireless communication channel, wherein the response message causes the smart phone to answer or ignore the telephone call.

23. The computer program product of claim 22 wherein the communication message is also a notification of the identity of the caller of the incoming telephone call, and the notification message further notifies the portable computing device as to caller identification information associated with the incoming telephone call.

24. A method for relaying communication between a Bluetooth-enabled smart phone and a Bluetooth-enabled portable computing device via a Bluetooth-enabled audio sink, comprising:

using the Bluetooth-enabled audio sink to establish a first wireless communication channel between the audio sink and the smart phone and a second wireless communication channel between the audio sink and the portable computing device, the first wireless communication channel being distinct from the second wireless communication channel;

using the audio sink to receive a communication message from the smart phone via the first wireless communication channel, wherein the communication message is regarding an incoming telephone call that has not been answered by the smart phone, and has a first message format;

using the audio sink to translate the communication message having the first message format into a notification message having a second message format, the second message format being distinct from the first message format;

using the audio sink to transmit the notification message to the portable computing device via the second wireless communication channel, where the notification message notifies the portable computing device as to the reception of an incoming telephone call that has not been answered by the smart phone;

in response to the portable computing device receiving the notification message, using the portable computing device to send an instruction message to the audio sink over the second wireless communication channel, the instruction message being responsive to a user providing the portable computing device with an instruction for the smart phone to answer or ignore the telephone call, the instruction message having the second message format;

using the audio sink to translate the instruction message having the second message format into a response message having the first message format; and using the audio sink to transmit the response message to the smart phone via the first wireless communication channel, wherein the response message causes the smart phone to answer or ignore the telephone call.

25. The method of claim 24 wherein the communication message is also a notification of the identity of the caller of the incoming telephone call, and the notification message further notifies the portable computing device as to caller identification information associated with the incoming telephone call.

* * * * *